June 24, 1947.   H. H. FLEER   2,422,959
DOWNDRAFT MAGAZINE HEATER
Filed Aug. 23, 1943   4 Sheets-Sheet 1

Inventor
HARRY H. FLEER
by Charles... Attys

June 24, 1947.  H. H. FLEER  2,422,959
DOWNDRAFT MAGAZINE HEATER
Filed Aug. 23, 1943  4 Sheets-Sheet 2

Inventor
HARRY H. FLEER.
by Charles Will Attys

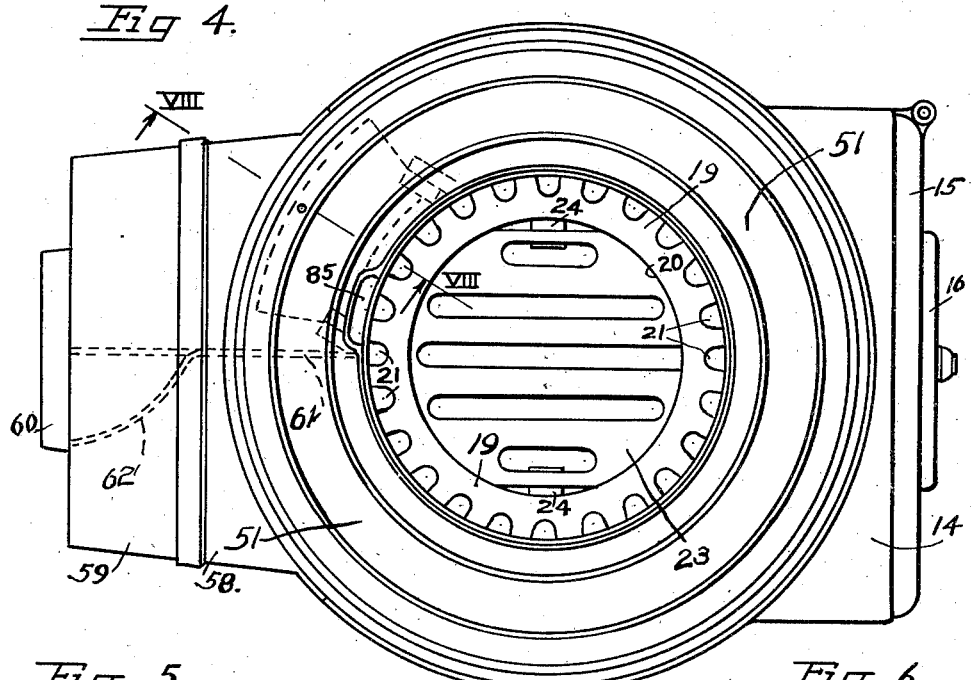
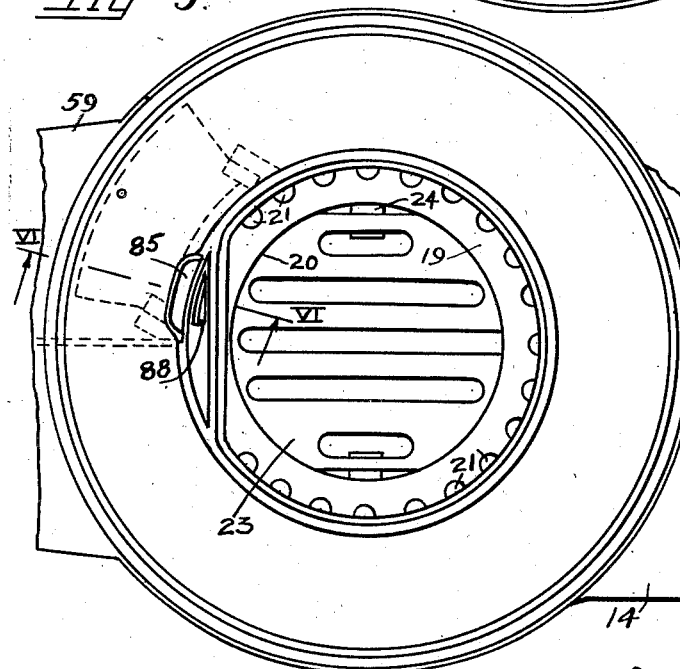
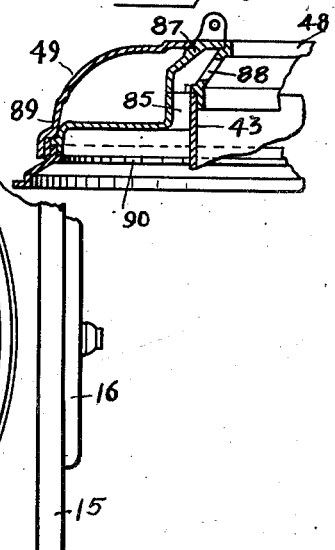

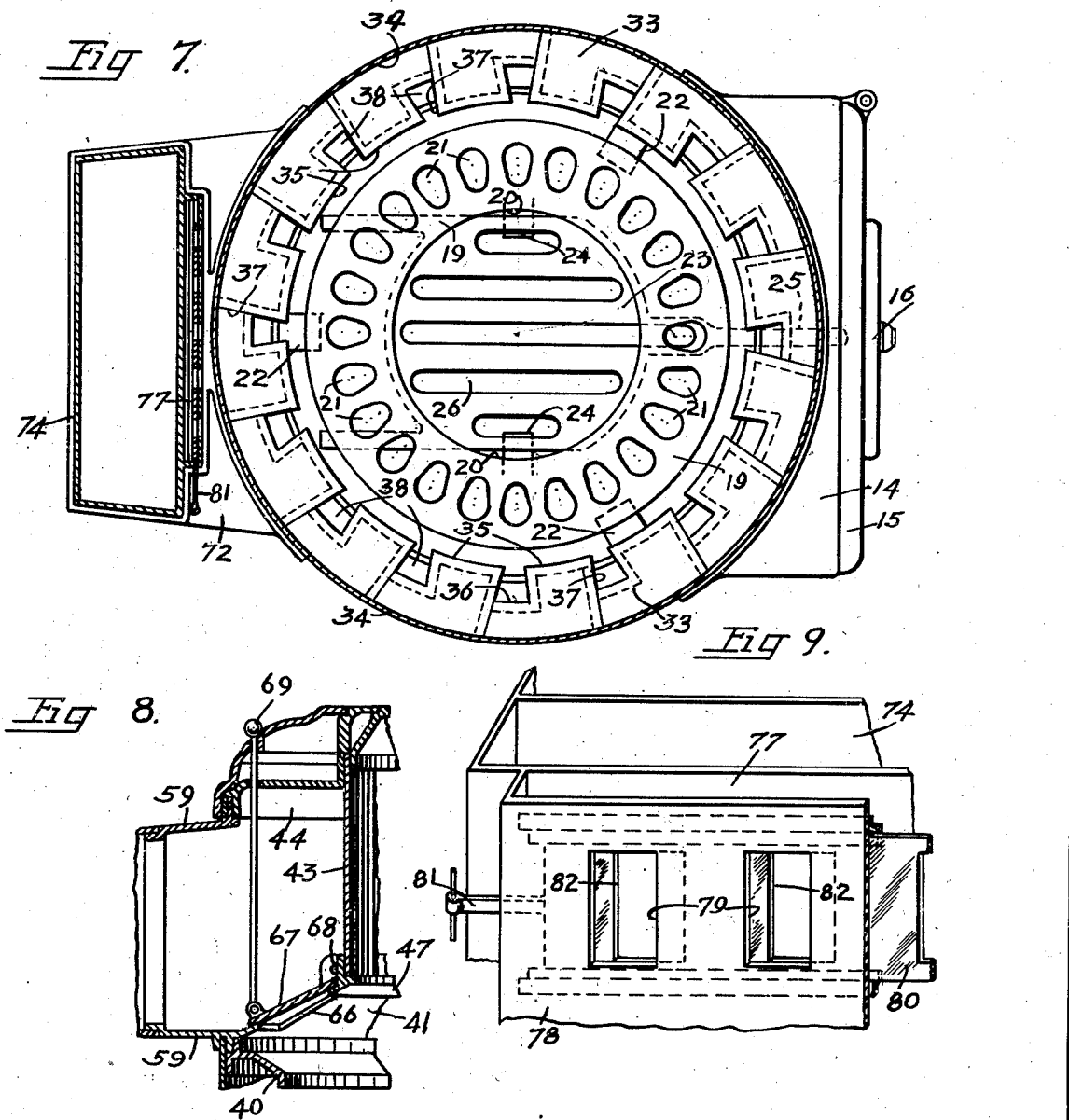

Patented June 24, 1947

2,422,959

UNITED STATES PATENT OFFICE 2,422,959

DOWNDRAFT MAGAZINE HEATER

Harry H. Fleer, Quincy, Ill., assignor to Gem City Pattern Co., Quincy, Ill., a corporation of Illinois Application August 23, 1943, Serial No. 499,600

4 Claims. (Cl. 126—74)

The present invention relates to a method of heating and an appliance therefor. More particularly, the invention concerns space heating and a heater for accomplishing this result which advantageously takes the form of a magazine heater.

It has been found that a higher B. t. u. output may be realized from a space heater by the proper utilization of the gaseous products of combustion. This may be accomplished by providing a burnable mixture of air with the gaseous products of combustion within the combustion chamber or at some point between the combustion chamber and the vent through which these gases are discharged to the atmosphere and thereby to increase the efficiency of the fuel employed. Moreover, the surface for heat radiation may thus be increased to improve the efficiency of the heating unit.

It is an object of the present invention to provide a method of heating which will effectively increase the output of heat from the combustion of solid fuels and a heater structure embodying these principles to produce the aforementioned desirable and advantageous results.

It is also an object of the present invention to provide a magazine type heater which is efficient in operation but simple and economical to manufacture.

It is a further object of the present invention to provide a method of and means for venting the combustion chamber to prevent a backdraft and the emission of smoke or fumes from the combustion chamber into the space to be heated during the operation of the apparatus.

A still further object of the invention is to provide a method of and means for increasing the travel of the gaseous products of combustion before discharging them through the vent or smoke pipe to extract the maximum amount of heat therefrom and thereby increase the efficiency of the heating operation.

Another and still further object of the invention is to provide a method of and means for introducing secondary air to the heating unit whereby the combustible gases emerging from the combustion chamber will be caused to be burned so as to produce additional heat rather than to be wasted by being discharged from the heating unit.

In accordance with the general features of the present invention, there is provided a method of heating through the combustion of solid fuel which includes among other things the steps of withdrawing the gaseous products of combustion from the combustion area at a point adjacent its base, passing them to a point adjacent the upper extremity of the combustion area and directing them about the entire periphery of the combustion area so as to substantially completely encircle the air current supplied to the combustion area before discharging the same.

The present invention also contemplates the step of supplying a secondary current of air from the exterior of the combustion area but in close proximity thereto which has been pre-heated for admixture with the gaseous products of combustion withdrawn from the combustion area so as to aid in producing the maximum efficiency from the fuel which is being burned in the combustion area.

The present invention contemplates further a method of by-passing any of the gaseous products of combustion which may gather adjacent the upper extremity of the combustion area to prevent their being emitted into the space being heated and providing a safety feature of considerable importance in the effective operation of the heating means.

In accordance with still further general features of the invention, there is provided in a magazine heater means for accomplishing the steps in the heating process hereinabove set forth.

Other objects and advantages of the present invention will be readily apparent from the description of an embodiment of the invention illustrated in the accompanying drawings, in which:

Figure 4 is a plan view of the apparatus of Figure 1 with the top castings removed;

Figure 5 is a plan view of the device of Figure 1 corresponding substantially to that of Figure 4 but with additional parts removed;

Figure 6 is a partial vertical cross section taken along the line VI—VI in Figure 5;

Figure 7 is a horizontal cross section taken through the device of Figure 1 as seen from the line VII—VII therein;

Figure 8 is a partial vertical section as seen from the line VIII—VIII in Figure 4; and Figure 9 is an isometric view of a portion of the apparatus of Figure 1 illustrating the secondary air inlet channel.

Figure 1:
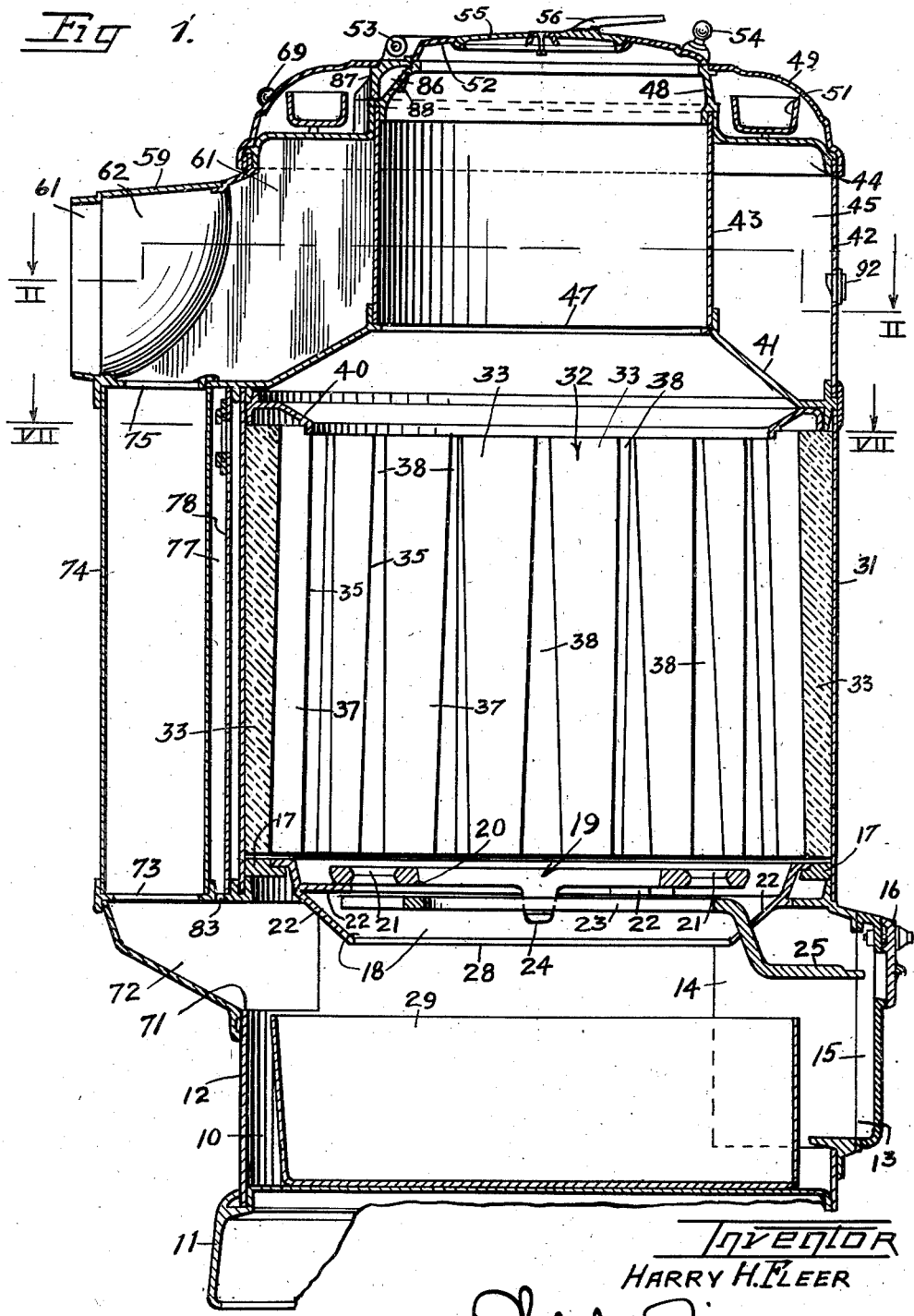
Figure 1 represents a vertical cross section through a typical magazine type heater which embodies the principles of the present invention.

The magazine heater unit illustrated in Figure 1 of the drawings is provided with a base portion 11 into which is fitted a substantially cylindrically-shaped member 12 which encloses a chamber or ashpit 10. Adjacent the righthand side of the cylindrical member 12 as seen in Figure 1 is secured in any suitable fashion a front casting 14 which is provided at the opening 13 therein with an ash door 15 providing access to the ashpit 10. The door 15 is swingably mounted as by means of suitable hinges and is provided with an air inlet which takes the form of a slide 16 in the face thereof which is adapted to be regulated from an open to a closed position as may be desired in the operation of the heater.

A ring 17 is supported at the upper end of the ashpit 10 by the cylindrical member 12 and supports the grate frame 18 therefrom in the manner illustrated in Figure 1. The grate frame 18, in turn, supports the grate 19 which is illustrated as being annularly shaped and provided with a centrally disposed opening 20 therein adjacent to which a plurality of apertures 21 are arranged in annularly-spaced relation. The grate 19 may be supported in any suitable fashion from the grate frame 18 such, for example, as by means of a plurality of horizontally projecting lugs 22.

Supported from the under side of the grate 19 and partially closing the central opening 20 therein is a shaker member 23. Shaker member 23 is of the draw-center type and is adapted to be moved in slidable relation to the grate 19 on the supporting means 24 depending from the grate 19. The shaker member 23 may be operated as by means of the handle portion 25 which extends downwardly into the ashpit 10 adjacent the door 15 therein. The shaker member 23 is provided with a plurality of slots 26 which are advantageously arranged in parallel relation to each other although any other suitable construction may be substituted therefor.

The grate frame 18 has an opening 28 therein which is disposed substantially directly below the grate 19 and its associated shaker member 23 so as to permit the passage therethrough of the ash or other solid products of combustion into the ashpit 10. A pin 29 or other suitable form of container is provided in the ashpit 10 for the collection of this residue. The pan 29 is preferably of such a dimension that it may be removed from the ashpit 10 through the door 15 therein when it is desired to empty the accumulation of residue collected therein.

A jacket 31 of generally cylindrical shape is mounted above the cylindrical member 12 and forms the outer enclosure for the firebox or combustion chamber 32. The interior of the jacket 31 is provided with any suitable form of insulating means such, for example, as a plurality of co-operatively arranged firebricks 33 which extend substantially axially thereof. The firebricks 33 are formed from fire clay or any other suitable fire-resistant refractory material.

Each of the bricks 33 is advantageously formed in the manner shown in Figure 7 of the drawings which represents a plan of the combustion chamber 32. An outer arcuate surface 34 of each of the firebricks 33 is placed in contiguous relation with the inner surface of the jacket 31, while a similar arcuate surface 35 serves to form a substantially cylindrically-shaped interior for the firebox 32. A substantially wedge-shaped reentrant portion 36 extending inwardly from the arcuate surface 35 of each of the firebricks co-operates with the end wall 37 of an adjoining brick 33 to form a substantially axially extending channel 38 which is substantially coextensive with the overall length of the combustion chamber 32 and is advantageously slightly wider at its base. A collar 40 surmounts the firebricks 33 and is adapted to hold them in place within the jacket 31 at their uppermost ends.

An annular member 41 is disposed immediately above the collar 40 and is supported by the upper end of the jacket 31. Secured to the outer periphery of the annular member 41 is an outer generally cylindrically-shaped shell 42, while a similar inner shell 43 is supported by the annular member 41 adjacent its innermost periphery. A generally annularly-shaped cover member 44 is supported from the uppermost ends of the outer shell 42 and the inner shell 43. The outer shell 42, the inner shell 43, the annular member 41 and the cover member 44 co-operate to form therebetween a substantially completely enclosed annular flue 45 extending about and directly above the entire outer periphery of the combustion chamber 32. The inner shell 43 is adapted to encircle the central opening 47 in the annular member 41 so as to provide communication with the interior of the combustion chamber 32 from the upper end of said inner shell 43.

A ring member 48 is supported by the upper end of the inner shell 43 and co-operates with the cover member 44 to support a plurality of grille sections 49 arranged above and about the upper surface of the cover member 44. The grille segments 49, which are provided with a plurality of substantially vertically-extending slots 50, are shown as being formed in a plurality of arcuate portions so that they may be readily removed for access to the generally arcuately formed basin 51 supported by the cover member 44 which are adapted to contain water for increasing the moisture content of the heated air supplied by the heating unit. Mounted upon the ring member 48 is a lid 52 as by means of the hinges 53 so as to permit it to be raised and lowered by means of the handle 54 for access to the central opening 47 and the upper end of the combustion chamber 32 for the introduction of fuel thereto. An adjustable draft regulator 55 is disposed in the lid 52 and adapted to be adjusted by the handle 56 thereon.

Figure 2:
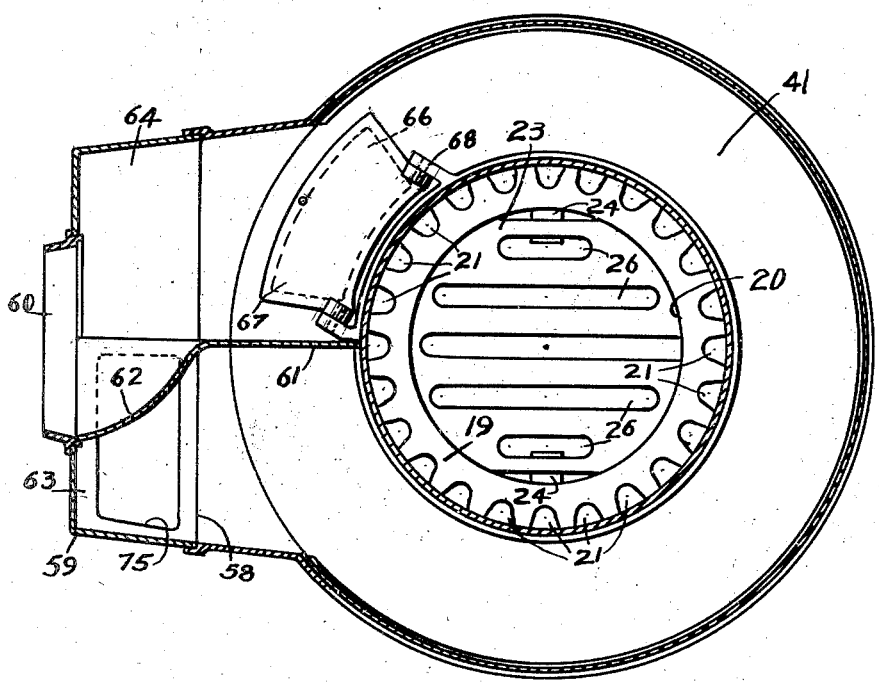
Figure 2 is a horizontal cross section through the upper portion of the device of the apparatus of Figure 1 as seen from the line II—II.

A smokebox 59 is secured to an opening 58 in the outer shell 42. A collar portion 60 secured to the outer wall of the smokebox 59 provides a vent for connection with the chimney or smoke pipe, as the case may be, to remove the smoke and other gaseous products of combustion from the heating unit. A baffle 61 extending substantially vertically from the annular member 41 to the cover member 44 is provided in the annular flue 45. A curved wall 62 disposed in the smokebox 59 and adapted to register with or, as indicated in Figures 1 and 2 of the drawings, to be integral with the baffle 61, serves to divide the smokebox into compartments 63 and 64. It will be noted that the compartment 64, by virtue of the disposition of the curved wall 62, connects directly with the collar member 60 which is, in turn, connected directly to the chimney or other form of smoke pipe.

Figure 3:
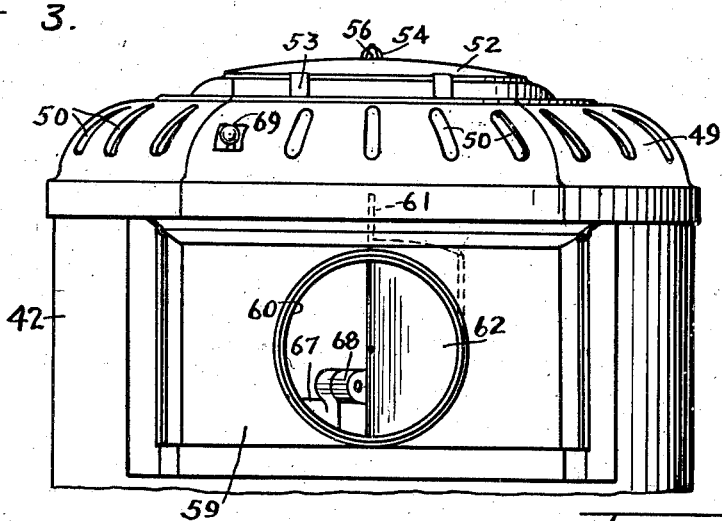
Figure 3 is a partial rear elevation of the upper end of the structure of Figure 1 showing the vent or smoke pipe connection for the heater.

In the web portion of the annular member 41 (Figure 2) and adjacent the baffle 61 is a flue opening 66. A damper 67, pivotally mounted as by means of the hinges 68, is provided to open and close the flue opening 66 as may be desired in the operation of the heating unit. Secured to the damper 67 is a control rod 69 which extends upwardly through one of the segments 49 to the exterior of the heating unit adjacent the lid 52 (Figure 3). By the manipulation of the control rod 69, the damper 67 may be raised or lowered with respect to the flue opening 66 in the annular member 41.

An opening 71 adjacent the uppermost end of the cylindrical member 12 and at the back portion of the ashpit 10 substantially diametrically opposite to the opening 13 and the door 15 provides a means of connection for the pouch casting 72 having an opening 73 in the uppermost end thereof. A vertically extending pipe 74 registers with the opening 73 in the pouch casting 72 and connects with the under side of the smokebox 59 so as to communicate with the chamber 63 therein through the opening 75. As will be understood from Figures 1 and 2 of the drawings, the pouch casting 72, the pipe 74 and the chamber 63 of the smokebox 59 serve to interconnect the ashpit 10 with the air chamber 45.

A duct 77 extending longitudinally of the vertically extending pipe 74 and adjoining the same but advantageously disposed between said pipe 74 and the jacket 31 serves to introduce secondary air to the heating unit. The duct 77 is closed at its uppermost end by the annular member 41 but is provided in the outermost wall 78 thereof with a plurality of apertures 79 in close proximity to its uppermost end. A slidable shutter 80 (see Figure 9) is mounted upon the wall 78 of the duct 77 and is adapted to adjust the extent to which the apertures 79 are opened or closed. A handle 81 secured to one end of the shutter 80 serves to position the shutter so that the openings 82 therein register to the extent desired with the apertures 79 in the wall 78 so as to control the influx of air to the duct 77 which communicates with the pouch casting 72 as by means of an opening 83. The location of the duct 77 is such that the air passing therethrough is warmed by conduction from the pipe 74 in the operation of the heating unit.

Another feature of the present invention is illustrated to advantage in Figures 4 to 6 inclusive of the drawings. An enclosed substantially vertically extending passageway 85 is formed integrally with or otherwise suitably secured to the wall of the cover member 44 and communicates with a chamber 86 formed between the substantially arcuate casting 87 and the wall of the ring member 48. This chamber 86 communicates with the interior of the ring member 48 beneath the lid 52 as by means of a small aperture 88 extending therethrough. The vertically extending passageway 85 opens into the annular flue 45 through the cover member 44 at the opening 90 therein. The chambers 87 and 45 connected by the vertically extending passageway 85 and co-operating with the aperture 88 serve to provide a by-pass from the upper end of the combustion chamber 32 for any smoke or other gaseous products of combustion which may accumulate in the interior of the inner shell 43 adjacent to the under side of the lid 52 and serve to prevent the possibility of smoke back or puffing.

The novel method of heating and the structure for accomplishing this result will best be understood from a description of the method of its operation. When it is desired to place the heating unit in operation, the lid 52 is opened by grasping the handle 54 thereon and swinging it about the hinges 53 on which it is mounted. Any solid fuel such, for example, as paper, wood, coal or the like is admitted to the interior of the inner shell 43 and passes through the opening 47 at the lowermost end thereof into the combustion chamber 32, being supported therein by the grate 19 and shaker member 23. The control rod 69 is raised thereby causing the damper 67 to be raised and opening the flue opening 66 in the upper surface of the annular member 41. The air inlet 55 in the lid 52 is closed and the slide 16 in the door 15 for the ashpit 10 is opened, after which the fuel contained in the combustion chamber is ready to be ignited.

When the fuel has been ignited the arrangement of the slide 16 and the opening of the damper 67 will result in a strong updraft of air being provided and passing upwardly through the combustion chamber out through the opening 66 in the annular member 41 through the chamber 64 of the smokebox 59 and out through the collar 60 to the chimey or other suitable smoke pipe. This mode of operation of the heating unit is continued until such time as the fuel charge contained in the combustion chamber 32 is completely ignited.

The control rod 69 is then shifted so that the damper 67 will be lowered to close the opening 66 in the annular member 41. The air inlet 55 is now adjusted so as to permit the entry of air through the lid 52 into the upper end of the combustion chamber 32 through the inner shell 43. The slide 16 in the door 15 is now closed so as to prevent the entry of further air into or through the ashpit 10. Now the air required for the combustion of the fuel charge in the combustion chamber 32 enters through the air inlet 55 and passes downwardly through the combustion chamber but is advantageously caused to follow the channels 38 formed between the adjacent firebricks 33 which serve as a lining for the jacket 31 and enters the ashpit 10 through the grate 19 and the shaker member 23. The air which is commingled with the gaseous products of combustion now passes through the pouch casting 72 upwardly through the pipe 74 and opening 75 into the annular flue 45.

The baffle 61 disposed in the air chamber 45 and extending between the annular member 41 and the cover member 44 together with the curved wall 62 serve to prevent this upward flow of air and gaseous products of combustion which enters the compartment 63 in the smokebox 59 through the opening 75 therein from escaping through the collar member 60 until after they have passed completely around the external periphery of the inner shell 43 in the flue 45 to the compartment 64 of the smokebox 59. This travel of air and intermingled products of combustion withdrawn from the combustion chamber 32 by the pouch casting 72 and the pipe 74 being at a high temperature results in the introduction of a vastly increased radiating capacity for the heating unit. It aids further in elevating the temperature of the air which is drawn through the air inlet 55 and passes downwardly through the interior of the inner shell 43 into the combustion chamber 32 thereby increasing the efficiency of operation of the heating unit.

At any time during the functioning of the heating unit on the downdraft stage of its operation, the shutter 80 may be adjusted by the use of the handle 81 so as to permit the entry of secondary air into the duct 77 and thence through the opening 83 at the base thereof into the pouch casting 72 and the pipe 74 so as to mingle with the air and gaseous products of combustion passing therethrough into the annular flue 45. The introduction of the secondary air through the apertures 79, as previously indicated, creates a flow of preheated air through the duct 77 and into the pouch casting 72 at which point the gaseous products of combustion are being withdrawn from the combustion chamber 32. This preheated air permits a continuance of the combustion of those portions of the gaseous products of combustion emerging from the combustion chamber 32 which are combustible but lack only sufficient air to complete the combustion thereof. As a result of this arrangement less flue gas is permitted to escape through the collar 60 to the chimney without being burned thereby greatly increasing the efficiency of operation of the heating unit.

A thermometer 92 may advantageously be mounted in the wall of the outer shell 42 for the purpose of determining either the temperature of the room or space being heated or the temperature of the heating unit itself. If desired, a thermostatic control unit may be coupled with the thermometer 92 for the automatic control of the operation of the heating unit. Other modifications of similar character may be applied to the structure of the heating unit and will be readily apparent.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a magazine heater of the type adapted to burn solid fuel, a body member enclosing a combustion chamber, means for supplying updraft air to the bottom of the combustion chamber, means for supplying downdraft air to the top of the combustion chamber, an annular flue around the means for supplying downdraft air, an upstanding flue conduit extending alongside of the body member connecting the bottom of the combustion chamber with the annular flue, a smoke outlet on said body member communicating with said annular flue, a baffle in said annular flue between the upstanding flue conduit and the smoke outlet arranged to direct gases from the upstanding flue conduit completely around the annular flue before reaching the smoke outlet, and a damper controlled passage between the top of the combustion chamber and the annular flue whereby said heater can be operated on an updraft or a downdraft principle with the downdraft air being preheated before it reaches the combustion chamber.

2. In a magazine heater, means defining a combustion chamber, a vent, a downdraft air chamber above the combustion chamber, an annular flue around the air chamber communicating with the vent, a flue conduit alongside of the combustion chamber for directing air and gaseous products of combustion from beneath the combustion chamber upwardly to the annular flue, a baffle in the annular flue directing said gaseous products of combustion around the annular flue and thence to the vent, a secondary air inlet communicating with said flue conduit adjacent the lower end thereof, and means defining a passageway to said air inlet in thermal relationship with the combustion chamber to preheat the secondary air before it reaches said inlet.

3. A stove comprising a stove body, a grate frame in said body above the bottom thereof, a grate supported by said frame dividing the body into a lower ash compartment and an upper combustion compartment, firebrick lining said body around said combustion compartment having a plurality of circumferentially spaced channels connecting the top and bottom of the combustion chamber, a hood for said combustion chamber disposed in the body at the top of the combustion chamber and defining a downdraft air chamber for the combustion chamber, said hood cooperating with said body to define an annular flue around the downdraft air chamber, a smoke outlet on said body communicating with said annular flue, an upstanding flue conduit alongside of the body connecting the ash compartment with the annular flue, a baffle in said annular flue between the upstanding flue conduit and the smoke outlet for directing gases around the annular flue, a damper-controlled opening in said hood connecting the top of the combustion compartment with the annular flue, and a damper-controlled air inlet for the ash compartment whereby selected positions for the dampers will operate the stove on an updraft or downdraft principle while downdraft air will be preheated by gases in the annular flue.

4. A magazine type stove comprising a base member defining an ash pit, an ash door on said base member, a flue pouch on said base member, a casing mounted on top of said base member enclosing a combustion chamber, a grate between the combustion chamber and ash pit, a hood on said casing defining a downdraft air inlet to said combustion chamber, a second casing on said first mentioned casing surrounding said hood and cooperating therewith to define an annular flue, a smoke box cooperating with said second casing having an inlet above said pouch and a first outlet communicating with said annular flue, a flue pipe connecting said pouch with said inlet of the smoke box, a fuel-charging door closing the top of said hood, an air inlet at the top of said hood, a damper for controlling said air inlet, said hood having an opening connecting the top of the combustion chamber with the annular flue, a damper controlling said opening, means defining a secondary air inlet path communicating with said pouch and extending between the flue pipe and the first mentioned casing, and a valve controlling said secondary air inlet.

HARRY H. FLEER.

REFERENCES CITED

The following references are of record in the file of this patent:

UNITED STATES PATENTS

| Number | Name | Date |
|---|---|---|
| 698,810 | Cahoone | Apr. 29, 1902 |
| 54,830 | Eaton | May 15, 1886 |
| 5,894 | Frost | June 2, 1874 |
| 35,135 | Buttles | May 6, 1862 |
| 249,617 | Hawley | Nov. 15, 1881 |
| 1,198,109 | Clow | Sept. 12, 1916 |
| 698,806 | Cahoone | Apr. 29, 1902 |
| 914,923 | Cahoone | Mar. 9, 1909 |